United States Patent [19]

Shapero

[11] Patent Number: 5,506,290
[45] Date of Patent: Apr. 9, 1996

[54] PLASTIC MOLDABLE COMPOSITION

[76] Inventor: Wallace Shapero, 23618 Balmoral La., West Hills, Calif. 91307

[21] Appl. No.: 288,544

[22] Filed: Aug. 10, 1994

Related U.S. Application Data

[63] Continuation-in-part of Ser. No. 248,320, May 24, 1994, abandoned, which is a continuation-in-part of Ser. No. 149,629, Nov. 9, 1993, abandoned.

[51] Int. Cl.$^6$ .............................. C08K 3/20; C08K 3/34; C08L 5/04; C08L 1/26
[52] U.S. Cl. .............................. 524/389; 524/28; 524/43; 524/55; 524/276; 524/312; 524/377; 524/378; 524/405; 524/425; 524/487; 524/492; 524/318
[58] Field of Search .......................... 524/389, 312, 524/492, 405, 425, 487, 43, 55, 28, 276, 310, 377, 318; 106/38.2, 38.35

[56] References Cited

U.S. PATENT DOCUMENTS

| | | | |
|---|---|---|---|
| 3,914,405 | 10/1975 | Sheperd | 424/49 |
| 4,076,547 | 2/1978 | Lester et al. | 106/109 |
| 5,171,766 | 12/1992 | Mariano et al. | 523/218 |
| 5,278,237 | 1/1994 | Kita | 525/207 |
| 5,296,166 | 3/1994 | Leong | 252/314 |

*Primary Examiner*—Paul R. Michl
*Assistant Examiner*—Lavonda R. DeWitt
*Attorney, Agent, or Firm*—Malcolm B. Wittenberg

[57] ABSTRACT

A cross-linked gel-like composition of matter. The composition is capable of being used as a modeling compound, as well as being moldable, extrudable, stretchable, and being inflated into bubbles for use as a play activity. The composition is based on a cohesive polyvinyl alcohol non-adhesive and substantially non-drying composition that is safe if accidentally ingested and can be washed from fabrics and carpets with water.

11 Claims, No Drawings

5,506,290

PLASTIC MOLDABLE COMPOSITION

RELATED APPLICATIONS

This application is a continuation-in-part of U.S. patent application Ser. No. 08/248,320 filed on May 24, 1994, now abandoned, which is a continuation-in-part of application Serial No. 08/149,629 filed Nov. 9, 1993, now abandoned.

TECHNICAL FIELD OF INVENTION

The present invention relates to a cross-linked gel-like composition of matter for use as a play activity. The present composition is capable of being used as a modeling compound as well as being moldable, extrudable, stretchable and being inflatable into bubbles. Being based on a cohesive polyvinyl alcohol non-adhesive and substantially non-drying composition, it is safe if accidentally ingested and can be washed from fabrics and carpets with water.

BACKGROUND OF THE INVENTION

There have certainly been a number of play compositions which are ductile and pliable such as those composed of grain flour based dough, modeling clay, silicone putty, natural gums and hydrophilic colloids. For example, U.S. Pat. No. 3,873,484 (Fichera) utilizes polyethylene oxide to make a shear sensitive composition as a play material. However, the polyethylene oxide composition cannot be extruded without degrading breaking up into small molecules which become sticky and thus unworkable.

By contrast, U.S. Pat. No. 4,735,660 (Cane) teaches a molding composition using guar gum in a gel with wood flour. The patentee employs a borate cross-link for the guar gum. U.S. Pat. No. 4,076,547 (Lester) teaches the use of a polyvinyl alcohol based composition which is cold water soluble. The patentee teaches a composition that converts to "a rigid, more-or-less permanent structure" which gels in thirty seconds and becomes permanently rigid in one to fifteen minutes. U.S. Pat. No. 5,171,766 teaches the fabrication of a modelling dough comprising a gelled polyvinyl alcohol based composition including water and a filler. Unlike the present invention, the '766 patent teaches a product which is intended to dry upon exposure to air to such an extent that it becomes sandable, carveable and paintable. These qualities are not shared by the present invention. The present invention produced a non-hardening composition due to the use of very high humectant and emollient levels herein, relatively low water content and the use of a hydrogen bonding agent. Finally, U.S. Pat. No. 4,315,779 (Heyd) teaches an alginate and hydrophilic cellulose polymer with glycerine. This composition exhibits a high viscosity which, at room temperature, is in the vicinity of 200,000 centipoise thus providing the composition with an elastic memory.

It is quite evident that there have been a number of play compositions which are both ductile and pliable such as doughs based upon grain flour, modeling clays, silicone puttys as well as compositions based upon natural gums and hydrophilic colloids. Many of these compositions are stretchable but each is limited to a narrow field of play activity.

Typically, grain flour doughs crumble and dry out after only a few hours of use. Modeling clays, on the other hand, are messy and frequently have oils and other staining ingredients which are difficult to remove from carpets. Silicone puttys cannot be removed from fabric and carpets and are thus not a preferred embodiment for use by children in any but a highly controlled environment where care is taken to prepare a work area. Compositions based upon cellulose gums, alginates, guar gum, xanthan gum as well as other hydrophilic gums are slimy or stretchy and thus cannot be extruded and molded to retain detail and shapes. In addition, when such materials are left to dry, they are subsequently unusable. Furthermore, when these gum-based compositions are left to inadvertently dry in the nap of a carpet, they are difficult if not impossible to later remove.

Recognizing the need to provide a more versatile play material, the present invention was configured. Specifically, it was found desirous to provide a play material that can be used for long periods of time without drying to the point that it becomes unusable, that would not be harmful if accidentally ingested and that exhibits a bright and shiny colorful appearance with no unpleasant odor. It was further sought to have a play material that is stretchable and which can be inflated into bubbles, which can be cleaned up and removed from carpets and fabrics with water, which can be molded retaining detail until it is reformed and which can be extruded smoothly. It was also desirous to produce a composition exhibiting all of the above properties while being moderate in cost.

These and further objects of the present invention will be more readily appreciated when considering the appended drawing, disclosure and claims, wherein:

The FIGURE is a block diagram illustrating the mixing steps employed in producing the present invention

SUMMARY OF THE INVENTION

The present invention is directed to a plastic moldable composition of matter. The composition is comprised of 1 to 30% by weight of a water soluble polyvinyl alcohol having a molecular weight range of from 13,000 to 186,000 and of a grade having 87 to 90% hydrolysis. The composition further includes 25 to 65% by weight of an emollient and humectant, 0.5 to 4 % by weight of a cross-linking agent, 1 to 30% by weight of a hydrogen bonding agent selected from the group consisting of precipitated amorphous silica and amorphous fumed silica, approximately 1 to 5 % of an aqueous or organo-soluble thickener and from 4 to 40% by weight of water.

DETAILED DESCRIPTION OF THE INVENTION

As noted previously, virtually every play material previously suggested suffers from one or more limitations which prevent such compositions from becoming universally acceptable. For example, grain flour doughs typically crumble and dry out after a mere few hours of play while modeling clays contain ingredients which stain work surfaces and carpeting. Similarly, silicone puttys cannot be removed from fabrics while compositions based upon gums are slimy or stretchy but cannot be extruded and molded to retain detail and shapes.

By contrast, the present invention being based upon a cold water soluble polyvinyl alcohol of specific molecular weight range in combination with a silica providing hydrogen bonding and other ingredients hereinafter described produces a play material which is virtually unlimited in its application as the material is moldable, stretchable, extrudable, inflatable, non-drying, and non-toxic.

The present composition is the combination of a number of ingredients which synergistically provide for the desirable properties recited above. Specifically, it is contemplated that the composition contain 1 to 30% by weight water soluble polyvinyl alcohol which is of a molecular weight range from 13,000 to 186,000 and is of a grade having 87 to 90% hydrolysis. It was determined that a low molecular weight polyvinyl alcohol tends to make a composition more moldable and extrudable. By contrast, a high molecular weight polymer makes the composition more stretchy and inflatable. As such, a blend of molecular weights provides the ability to perform a multitude of activities. In this regard, it is contemplated that the preferred embodiment of the present invention include approximately 70% by weight of the polyvinyl alcohol with a molecular weight of 31,000 to 50,000 and approximately 30% by weight with the molecular weight of 85,000 to 146,000.

The present invention should also include 4 to 40% by weight water and 25 to 65 % by weight of an emollient and humectant such as glycerine, polyglycol, polypropylene glycol and sorbitol. The present composition also employs between 0.5 to 4% by weight of a cross-linking agent. The crosslinking agent can be a boron oxide type such as boric acid, borax, zinc borate, sodium borate or a zirconium salt such as potassium zirconium carbonate, zirconate (2-), bis [carbonate(2-)-O]dihydroxy-diammonium. Finally, the present invention contemplates the use of from 1 to 5 % of an aqueous or organo-soluble thickener such as hydroxypropyl cellulose, hydroxyalky guar, propylene glycol alginate, gum karaya and similar materials.

The present invention contemplates using a minimum amount of water to dissolve the polyvinyl alcohol component. It is noted that the highest molecular weight polyvinyl alcohol requires three times as much water to maintain the polyvinyl alcohol in solution as compared to solubilizing the lowest molecular weight polyvinyl alcohol.

As noted, the present invention is directed to a plastic moldable composition of matter which remains moldable throughout its effective life. In carrying out this mandate, it is imperative that the amount of water lost during play or storage be insignificant in comparison to the effect that the humectant has upon the composition. In effect, the emollients contemplated for use herein provide body to the polyvinyl alcohol cross-linked gel and function as plasticizers to maintain the soft stretchy quality of a composition. Humectants prevent the loss of water to any significant extent so that the user may reconstitute the mass to its original softness merely by wetting one's hands with water. High levels of humectant make the mass receptive to the addition of a small amount of water lost during play while retaining the essential non-drying character of the composition.

As previously noted, either precipitated amorphous silica or amorphous fumed silica are employed for hydrogen bonding the polyvinyl alcohol gel into a very cohesive strong mass. The silica based materials tend to be translucent and permit very bright colors with little pigment or dye. Further, use of such materials make fillers such as clay, calcium carbonate, talc, alumina, ceramic or plastic microballoons unnecessary and, generally unwanted. Such fillers tend to be opaque and would thus detract from the bright colors capable of being achieved in the present play toy. Fillers would also require further liquid to wet their surfaces and would require more force for a young child to knead, mold, extrude or manipulate and would, in fact, reduce the quality of the mass for those activities contemplated for use of the present invention.

It is also contemplated that a preservative be employed. As such, 0.1 to 2% by weight of a suitable preservative such as imidazolidinyl urea, diazolidinyl urea, 1-(3chloroallyl)-3,5,7-triaza- 1-azoniaadamantane chloride which is sold by the Dow Chemical Company under the trademark Dowicil 200 can be incorporated in the present composition.

It is optionally preferred to employ a lubricant or slip agent which acts as a process aid in combining the various ingredients. Suitable lubricants include mineral oil, paraffin, amide wax or oxidized polyethylene wax between 0 and 5 % by weight. Finally, a suitable pigment or dye can be optionally employed. Without the pigment or dye, the composition is basically translucent while with up to 6% by weight of a suitable pigment or dye, the play material can be made to take on an array of vivid colors.

A particular useful composition was prepared having the following ingredients:

| Ingredient | Percent by Weight |
|---|---|
| Water | 7% |
| Polyvinyl alcohol | 3% |
| Propylene glycol | 40% |
| Glycerine | 25% |
| Borax | 2% |
| Pigment | 1.5% |
| Preservative | 1.5% |
| Silica | 14% |
| Lubricant | 2% |
| Thickener | 4% |

The flow diagram sets forth a process for producing the present invention. The basic material is formed of a polyvinyl alcohol which is dissolved in water to form a liquid. Since the purpose of this invention is to make a substantially non-drying mixture, a minimum amount of water must be used so that the loss by evaporation from the final product during play by the end user will be a minor part of the total composition. Specifically, the process begins with the slow addition, with agitation of polyvinyl alcohol into a measured amount of distilled water generally at room temperature or cooler (steps 10 and 11 ). After the addition of the polyvinyl alcohol, the temperature of the aqueous solution is raised to approximately 205° F. and held at that temperature for approximately thirty minutes while slowly stirring (step 12).

In a separate container, suitable quantities of glycerine, propylene glycol and appropriate lubricants such as wax are premixed. An appropriate thickener, such as hydroxypropyl cellulose is added to the propylene glycol prior to its admixture with glycerine and lubricants. This premix solution is then added to the aqueous polyvinyl alcohol solution (step 13). It is noted that polyvinyl alcohol of low molecular weight will dissolve in water to approximately 20 to 30% solids, medium molecular weight to about 10% solids and high molecular weight to about 7% solids. It is considered important to dissolve the polyvinyl alcohol in water without other ingredients competing for the water. Elevating the temperature of the aqueous solution of polyvinyl alcohol to from 185° to 205° F. while mixing slowly for thirty minutes or until no dissolved polyvinyl alcohol is visible in a sample determination is conducted prior to carrying out step 13. The emollients, humectants and lubricants which are premixed must also be warmed to approximately 205° particularly if there are any solids in the mixture. Mixing is continued until these various components are homogeneous before adding to the polyvinyl solution. While the mixture thus prepared is cooled to room temperature, a premixture of pigment, cross-linking agent and preservative are added and mixed until homogeneous (step 14). Silica is then mixed with the solution until homogeneous (step 15) and the mixture transported to storage and subsequent packing (step 16).

The present invention teaches a substantially non-drying plastic moldable composition. The novelty of this invention is rooted in the thermoplastic polymer, polyvinyl alcohol, which is miscible when dissolved in water with a variety of materials, such as glycols, polyglycols, fatty acid amides and a variety of fatty acid esters. In general, these materials can function primarily as flexiblizing agents as lubricants or as humectants. A humectant is generally regarded as a material whose primary ability is to retain water and aggressively take on water from the air or its environment in the compound. The present composition is intended to strongly retain water.

The viscosity of the present formulary can be varied by varying the viscosity of various ingredients such as propylene glycol which is used in its liquid state to solids such as carbowax (polyethylene glycol). The functionality of the present invention varies greatly with varying viscosity.

Because the present invention relies strongly on hydrogen bonding imparted by silica, the range of functionality in compatible materials which can be selected and appropriated to contribute lubricity, stretch, stiffness, water retention and emollients as well as clarity and other qualities as needed is exceedingly important. Certain polyglycols such as solid polyethylene glycols, triethylene glycol, bis( 2-ethylhexanoate), tetraethylene glycol di-2-ethylhexanoate, for example, function as softening agents or emollients or plasticizers. An emollient is regarded as a material whose primary ability or attribute is to soften or plasticize. It can soften the plastic molding compound but also be regarded as the material that softens and is soothing to the hands. Materials such as castor waxes have some hydroxyl functionality and are unquestionably excellent emollients as well as lubricants but are not generally regarded as humectants. Glyceryl tri-acetoxy stearate imparts a pleasant, tactile quality, a glossy appearance and lubricity for extrusion and mold release. Methyl hydroxystearate is an emollient that is a solid with a melting point of about 126° F. and is not a humectant.

It is noted that the present non-drying plastic moldable composition is quite polar. In order to enhance the release of this composition from polar surfaces such as user's hands, it is deemed necessary to include a non-polar lubricant which is a material that exudes to the surface of the composition because of its non-polar incompatibility. As such, care must be taken when using such lubricants as mineral oil or petroleum to avoid incorporating an amount that will leave an oily or greasy residue on one's hands and other surfaces.

Having thus described the principals of the invention together with illustrative embodiments thereof, it is to be understood that although specific terms are employed, they are used in a generic and descriptive sense and not for the purpose of limitation, the scope of the invention being set forth in the following claims.

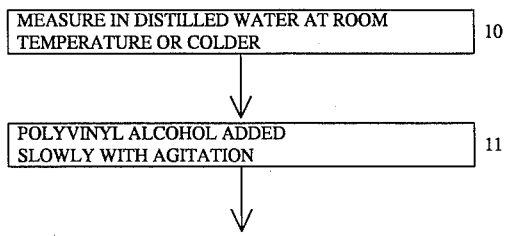

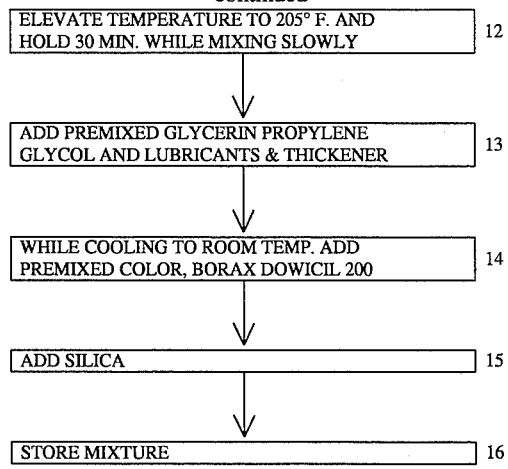

I claim:

1. A plastic moldable composition of matter comprising 1 to 30% by weight of water soluble polyvinyl alcohol having a molecular weight range of from 13,000 to 186,000 and of a grade having 87 to 90% hydrolysis, 25 to 65% by weight of an emollient and humectant, 0.5 to 4% by weight of a cross-linking agent, 1 to 30% by weight of a hydrogen bonding agent selected from the group consisting of precipitated amorphous silica and amorphous fumed silica, 4 to 40% water, and 1 to 5% of an aqueous or organo-soluble thickener said moldable composition being moldable, stretchable, extrudable, inflatable and non-drying throughout its effective life.

2. The plastic moldable composition of claim 1 further comprising a 0.1 to 2% by weight of a preservative.

3. The plastic moldable composition of claim 2 wherein said preservative comprises a member selected from the group consisting of imidazolidinyl urea, diazolidinyl urea and 1-(-3chloroallyl)-3,5,7- triaza-1-azoniaadamantame chloride.

4. The plastic moldable composition of claim 1 further comprising up to 6% by weight of a pigment or dye.

5. The plastic moldable composition of claim 1 wherein said humectant comprise a member selected from the group consisting of glycerine, polyglycol, propylene glycol and sorbitol.

6. The plastic moldable composition of claim 1 wherein said cross-linking agent comprises a member selected from the group consisting of boric acid, borax, zinc borate, sodium borate, potassium zirconium carbonate and zirconate(2-), bis[carbonate(2-)-O-]dihydroxy-diammonium.

7. The plastic moldable composition of claim 1 further comprising up to 5% of a lubricant comprising a member selected from the group consisting of mineral oil, paraffin, amide wax and oxidized polyethylene wax.

8. The plastic moldable composition of claim 1 wherein approximately 70% by weight of said polyvinyl alcohol is provided with a molecular weight of 31,000 to 50,000 while the remainder of said polyvinyl alcohol is provided with a molecular weight of 85,000 to 146,000.

9. The plastic moldable composition of claim 1 wherein said aqueous or organo-soluble thickener comprises a member selected from the group consisting of hydroxypropyl cellulose, hydroxyalky guar, propylene glycol alginate and gum karaya.

10. A plastic moldable composition comprising approximately 15% by weight water, approximately 9% by weight polyvinyl alcohol, approximately 27% by weight propylene glycol, approximately 24% by weight glycerine, approximately 2% by weight borax, approximately 1.5% by weight of a pigment, approximately 1.5% by weight of a preservative, approximately 14% by weight of a silica, approximately 2% by weight of a wax and approximately 4% by weight of hydroxypropyl cellulose, said moldable composition being moldable, stretchable, extrudable, inflatable and non-drying throughout its effective life.

11. The plastic moldable composition of claim 1 wherein said emollient comprises a member selected from the group consisting of polyethylene glycol, triethylene glycol bis(2-ethylhexanoate), tetraethylene glycol di-2-ethylhexanoate, castor waxes, glyceryl tri-acetoxystearate and methyl hydroxystearate.

* * * * *